3,230,240
FUSIDIC ACID AND DIHYDROFUSIDIC ACID DERIVATIVES
Wagn Ole Godtfredsen, Vaerlose, Denmark, assignor to Lovens Kemiske Fabrik Produktionsaktieselskab, Ballerup, Denmark, a company of Denmark
No Drawing. Filed Aug. 12, 1963, Ser. No. 301,587
Claims priority, application Great Britain, Aug. 15, 1962, 31,354/62
8 Claims. (Cl. 260—397.1)

This invention relates to some hitherto unknown compounds derived from fusidic acid and from dihydrofusidic acid.

Fusidic acid is a cyclopentenopolyhydrophenanthrene derivative in which the α-carbon atom of 5-methyl-4,5-heptenoic acid is attached by a double bond to the 17-position of the cyclopentenopolyhydrophenanthrene-ring system, whereas dihydrofusidic acid differs from fusidic acid only in that the heptenoic acid group of the latter corresponds to a similar heptanoic acid group in dihydrofusidic acid. In fusidic acid and in dihydrofusidic acid, the cyclopentenopolyhydrophenanthrene-ring system is further substituted with four methyl groups, one acetoxy group, and two hydroxy groups, of which one of the latter is in the 3-position, whereas the other until recently was presumed to be attached to the carbon atom in the 12-position. The latest investigations as regards constitutional elucidation, however, have established that the said hydroxy group is in the 11-position.

In particular, the present invention concerns such compounds of the fusidic acid and dihydrofusidic acid series, in which the hydroxyl groups in the 3- and 11-positions, or in only one of these positions, are converted into keto groups, the possibly remaining hydroxyl group being either α- or β-oriented.

The invention also relates to salts of these new acids with bases. Among water-soluble salts of particular interest, mention may be made of the alkali salts and the salts with pharmaceutically acceptable amines, such as triethylamine, diethylaminoethanol, piperidine, morpholine, cyclohexylamine, and monoetanolamine; among salts, which are sparingly soluble in water, mention may be made of the calcium, magnesium, dibenzyl-ethylene-diamine, benzyl-β-phenylethylamine, and procaine salts.

The compounds of the present invention have a substantial antibacterial effect on a variety of pathogenic micro-organisms, and are consequently useful in the treatment of certain infectious diseases, particularly in the treatment of diseases caused by, e.g. Staphylococci, *Neisseria gonorrhoea*, *Neisseria meningitidis*, Corynebacteriae, and Clostridiae, in particular their penicillin-resistant strains. Furthermore, several of the compounds are useful intermediates for the production of fusidic acid and dihydrofusidic acid.

The antibacterial effect of the present compounds has been demonstrated by a series of dilution tests, in which were determined the concentrations which resulted in 50% inhibition of the growth of the bacteria. The results appear from the following table, in which the figures represent the negative logarithm to the said concentration, the microorganisms tested being as follows:

FF: *Corynebacterium xerosis*
CJ: *Staphylococcus aureus* (Penicillin-sensitive)
CJ16: *Staphylococcus aureus* (Penicillin-resistant)
CQ: *Sarcina lutea*
KA2: *Bacillus subtilis*

Table

|  | FF | CJ | CJ16 | CQ | KA 2 |
|---|---|---|---|---|---|
| 3-Dehydrofusidic acid | | 6.8 | 6.8 | 6.8 | 6.3 |
| 11-Dehydrofusidic acid | 7.7 | 6.6 | 6.9 | 6.3 | 6.1 |
| 3,11-didehydrofusidic acid | 6.6 | 5.5 | 5.5 | 6.0 | 5.0 |
| 3-Dehydro-dihydrofusidic acid | 8.1 | 6.6 | 6.7 | 6.3 | 6.1 |
| 11-Dehydro-dihydrofusidic acid | 7.9 | 6.8 | 7.0 | 6.6 | 6.3 |
| 3,11-Didehydro-dihydrofusidic acid | 6.8 | 5.3 | 5.7 | 5.7 | 5.1 |

It is particularly interesting that some of the new compounds, especially 3-dehydro and 3,11-didehydrofusidic acid, are produced in varying amounts concurrently with fusidic acid when the latter is obtained by fermentation, while others may be obtained from fusidic acid or dihydrofusidic acid by way of chemical reactions.

As stated, fusidic acid is a known compound (previously called Antibiotic ZN-6) which can be produced by growing various micro-organisms, e.g. the fungus *Fusidium coccineum* Fùckel (K. Tubaki) or suitable fungi belonging to the tribus of Cephalosporieae, in an appropriate culture medium under aerobic conditions until an adequate amount of the antibiotic has been produced, whereupon the latter is recovered in known manner.

A variety of the well-known culture media have proved useful as culture media for carrying out the method, although culture media are preferred, containing corn-steep liquor or soy bean meal as a protein source, and glucose or saccharose as a carbohydrate source. Among the other constituents of a suitable culture medium mention may be made of, e.g. yeast extract, glycerine, maltose, fructose, fatty acids or their esters, casein hydrolysate, selected amino acids, and water soluble vitamins. When a satisfactory yield has been obtained, the antibiotic substance can be rceovered, e.g. by filtering off the mycelium and extracting the broth with a suitable solvent, such as methyl isobutyl ketone, after the broth has been adjusted to a suitable pH-value.

The acidic properties of fusidic acid permit the performance of a subsequent extraction of the organic phase with an aqueous alkaline solution whereby more concentrated aqueous solutions are obtained. The readily crystallizable benzene solvate of fusidic acid can be produced directly from the said aqueous solution, if necessary after part of the water having been removed by evaporation, by adding a sufficient amount of benzene and subsequently acidifying to precipitate the said benzene solvate of fusidic acid.

It has now been found that the benzene mother liquor from the said precipitation still contains some hitherto unknown compounds related to fusidic acid. The said compounds can be recovered from the benzene solution in different ways, e.g. by dissolving the residue, after the evaporation of benzene, in a small amount of a suitable solvent and chromatographing on a column of a suitable chromatographic agent, e.g. alumina, or silicagel. By fractional elution with combinations of organic solvents, two new compounds can be recovered from the eluate, viz. 3-dehydrofusidic acid and 3,11-didehydrofusidic acid.

The two compounds in question can also be obtained by way of chemical reactions, since when fusidic acid is reacted with suitable oxidizing agents, in particular chromic acid, it may be oxidized either in the 3-position or in the 11-position, or in both, dependent on the experimental conditions employed. The amount of the oxidizing agent and the composition of the reaction medium and the temperature during the reaction are determining for the kind of reaction product or products being obtained.

By reacting fusidic acid with reducing agents suitable for hydrogenation of a carbon to carbon double bond, dihydrofusic acid is obtained as disclosed in U.S. patent application Serial No. 238,076, filed November 14, 1962. Particularly suitable is a catalytic hydrogenation with noble-metal catalyst, e.g. platinum oxide, palladium on charcoal or on strontium carbonate, or ruthenium, or with Raney nickel. It is also possible selectively to hydrogenate the double bond in the heptenoic acid group of fusidic acid derivatives, containing keto groups at $C_3$ or $C_{11}$ or at both positions.

Similar to fusidic acid, dihydrofusidic acid can also be converted into the corresponding dehydro compounds forming, in particular, 3,11-didehydro-24,25-dihydrofusidic acid, if reacted with a suitable oxidizing agent.

Chromium trioxide in acetic acid is particularly suitable as an oxidizing agent by means of which the oxygenation can be performed at room temperature.

Furthermore, it has been found that, as is the case with the fusidic acid derivatives, a keto group in the 3-position of the said keto-containing derivatives of dihydrofusidic acid can be selectively hydrogenated with hydrogen in the presence of suitable noble-metal catalysts, without influencing the keto group in the 11-position. If the reduction is performed in an atmosphere of hydrogen at normal or slightly increased pressure and temperature and with addition of a catalyst as, e.g. platinum oxide, ruthenium, or Raney nickel, the corresponding $3\alpha$-hydroxy compound is obtained.

On the other hand, if potassium or sodium borohydride are employed as reducing agents, the 3-keto group can be converted into $3\beta$-hydroxy group, if desired.

Although the conversion of the 11-keto derivatives into the corresponding 11-hydroxy derivatives can be performed by methods employing reducing agents of general use, potassium or sodium borohydride are preferably used. In order to avoid a simultaneous reduction of a keto group possibly present in the 3-position, the said group can be protected temporarily during the process as a ketal or cycloketal group, or by other suitable means of protection.

If not protected, a keto group in the 3-position will be reduced to a $3\beta$-hydroxy group simultaneously with the reduction of the 11-keto group, and said $3\beta$-hydroxy group can, if desired, be converted into the corresponding $3\alpha$-hydroxy group in different ways, e.g. by esterification and subsequent hydrolysis, or by being selectively oxidized to a 3-keto group and subsequently reduced, using a suitable catalyst as mentioned before.

The acids of the invention, as prepared according to the above, can be recovered from the reaction mixtures by the methods generally used for the working up of pure products, e.g. by extraction with organic solvents or mixtures of such, recrystallization, et cetera. From the acids, the salts can be prepared by known methods, e.g. by neutralization of a solution of the acid with the base in question.

The compounds of the invention have the same low toxicity as have fusidic acid and dihydrofusidic acid, and can be administered parenterally, but are preferably administered orally owing to their high capacity of being absorbed from the gastro-intestinal tract. The substances can be administered in the form of tablets, capsules, or suspensions.

The following examples are illustrative of the products and processes of the present invention, but are not to be construed as limiting.

EXAMPLE 1

*Isolation of 3-dehydrofusidic acid and 3,11-didehydrofusidic acid from the fermentation broth of Fusidium coccineum*

The benzene mother liquid from the production of fusidic acid (see Example 1 in British patent specification, Serial No. 930,786) was dried and concentrated in vacuo to a small volume. After several days of standing most of the fusidic acid separated in the form of its crystalline benzene adduct. It was removed by filtration, and the filtrate, which contained 3-dehydrofusidic acid, 3,11-didehydrofusidic acid, and traces of fusidic acid, was evaporated in vacuo to dryness. The residue was chromatographed on fifty times its weight of "Florisil." The material was applied to the column in a benzene solution, and eluted consecutively with benzene containing 1%, 2% and 4% of ethanol. The fractions containing 3,11-didehydrofusidic acid were combined and evaporated to dryness. The residue was crystallized from acetone-hexane to yield 3,11-didehydrofusidic acid, melting point: 184.5 to 185.0° C.

The fractions containing 3-dehydrofusidic acid were combined and evaporated to dryness. The residue was crystallized from methanol-water to yield 3-dehydrofusidic acid, melting point: 175 to 178° C. Two recrystallizations from ether-hexane raised the melting point to 193.5° C.

Calc. for: $C_{31}H_{46}O_6$: C, 72.34; H, 9.01%
Found: C, 72.16; H, 8.87; Acetyl, 8.41%

EXAMPLE 2

*11-dehydrofusidic acid*

A solution of 12 g. of fusidic acid and 30 g. of sodium acetate (cryst.) in 150 ml. of acetic acid was reacted with a solution of 1.5 g. of chromic acid in 50 ml. of acetic acid at such a rate that the reaction mixture constantly remained green. The reaction period required was 4 hours, and, after another half hour, water was added, and the mixture extracted with benzene. From the washed and dried benzene solution unreacted fusidic acid was removed by filtration, and the filtrate evaporated to dryness. The crude ketone mixture was reacted with Girard Reagent P in the usual way to remove 3-keto compounds, the unreacted material being extracted with ether, evaporated to dryness, and chromatographed from benzene on a Florisil column. Benzene containing 3% of methanol eluated the 11-dehydrofusidic acid which was obtained as colourless crystals from ethyl acetate-cyclohexane. The analysis agreed with the formula $C_{31}H_{46}O_6$. Melting point: 192 to 193° C.

Reduction with sodium borohydride in methanol produced fusidic acid in quantitative yields.

By acid hydrolysis of the Girard complexes of the 3-keto compounds above, a mixture of 3-dehydrofusidic acid and 3,11-didehydrofusidic acid was obtained. When paper-chromatographed the said products proved identical with the compounds produced in Example 1.

EXAMPLE 3

*11-dehydro-24,25-dihydrofusidic acid*

A solution of 11-dehydrofusidic acid in ethanol was hydrogenated at atmospheric pressure with a palladium on charcoal catalyst. It absorbed 1 mole of hydrogen per mole of starting material, whereafter the hydrogenation ceased. The catalyst was filtered off, and the solution was evaporated to a small volume, and water was added.

By recrystallization from aqueous methanol the above compound was obtained as colourless crystals, melting point: 182 to 184° C. The analysis agreed with the formula $C_{31}H_{48}O_6$.

EXAMPLE 4

*3,11-didehydro-24,25-dihydrofusidic acid*

To a solution of 10.4 g. of 24,25-dihydrofusidic acid in 50 ml. of glacial acetic acid, 26.6 ml. of a 10% solution of chromium trioxide in acetic acid was added over 15 minutes.

After standing for a further 30 minutes water was added to precipitate the reaction product.

The reaction product was collected and recrystallized from methanol-water to yield 5.7 g. of the above compound, melting point: 204 to 205° C. A further recrystallization from acetonitrile raised the melting point to 206 to 207° C., $[\alpha]_D^{20} = +123°$.

Calc. for $C_{31}H_{46}O_6$: C, 72.34; H, 9.01%
Found: C, 72.24; H, 8.95%

EXAMPLE 5

*3-dehydro-24,25-dihydrofusidic acid*

(a) A mixture of 10 g. of 3,11-didehydro-24,25-dihydrofusidic acid, 500 mg. of p-toluenesulfonic acid, and 100 ml. of butanone ethyleneketal was refluxed for 20 minutes. After cooling, 500 ml. of ether and 1 ml. of pyridine were added, and the resulting solution was washed with water, dried, and evaporated to dryness in vacuo. The resulting amorphous residue was dissolved in 25 ml. of methanol, and carefully neutralized with 33% aqueous sodium hydroxide. After concentration in vacuo, 100 ml. of acetone were added to precipitate the crystalline sodium salt of the 3-monoketal which was collected, washed with acetone, and dried.

(b) To a solution of 9.5 g. of sodium salt of the 3-monoketal in 50 ml. of methanol a solution of 1 g. of sodium borohydride in 20 ml. of water was added.

After standing for 40 minutes the solution was acidified with hydrochloric acid and heated on the steam bath for 10 minutes.

After cooling and addition of water, the 3-monoketone crystallized. It was collected and dried, melting point: 170 to 174° C.

Recrystallization from methanol-water raised the melting point to 174.5 to 175.0° C. $[\alpha]_D^{20} = +27°$ (1% in chloroform).

*Analysis.*—Calc. for: $C_{31}H_{48}O_6$: C, 72.06; H, 9.36%.
Found: C, 72.13; H, 9.38%.

EXAMPLE 6

*11-dehydro-24,25-dihydrofusidic acid*

To a solution of 3.09 g. of 3,11-didehydro-24,25-dihydrofusidic acid in 30 ml. of acetic acid, 50 mg. of platinum oxide catalyst and 6 drops of concentrated hydrochloric acid were added. The mixture was shaken at room temperature at one atmosphere of hydrogen pressure until 170 ml. of hydrogen had been absorbed. The catalyst was removed, and the filtrate evaporated to dryness in vacuo. The amorphous residue was practically pure 11-dehydro-24,25-dihydrofusidic acid which after recrystallization from aqueous methanol had a melting point of 182 to 184° C., and was identical with the 11-dehydro-24,25-dihydrofusidic acid described in Example 3.

I claim:

1. A compound selected from the group consisting of 3-dehydrofusidic acid, 11-dehydrofusidic acid, 3,11-didehydrofusidic acid, 3-dehydro-24,25-dihydrofusidic acid, 11-dehydro-24,25-dihydrofusidic acid, 3,11-didehydro-24,25-dihydrofusidic acid, and pharmaceutically acceptable salts thereof.
2. 3-dehydrofusidic acid.
3. 11-dehydrofusidic acid.
4. 3,11-didehydrofusidic acid.
5. 3-dehydro-24,25-dihydrofusidic acid.
6. 11-dehydro-24,25-dihydrofusidic acid.
7. 3,11-didehydro-24,25-dihydrofusidic acid.
8. The method of producing a compound selected from the group consisting of 3-dehydrofusidic acid and 3,11-didehydrofusidic acid, in which *Fusidium coccineum* Fukel (K. Tubaki) is grown under aerobic conditions in a fermentation medium containing carbohydrates, nitrogen sources, and the inorganic salts and other substances necessary for the nutrition of the fungus, the fermentation being continued until substantial amounts of 3-dehydrofusidic acid and 3,11-didehydrofusidic acid are produced, whereafter they are separated and isolated in pure form as the free acids or salts thereof.

References Cited by the Examiner

Loewenthal, Tetrahedron, vol. 6, No. 4, p. 269–303, June 1959.

LEWIS GOTTS, *Primary Examiner.*